P. ASKENASY & M. MUGDAN.
PROCESS OF MAKING DICHLORETHYLENE.
APPLICATION FILED OCT. 4, 1907.
924,304.
Patented June 8, 1909.
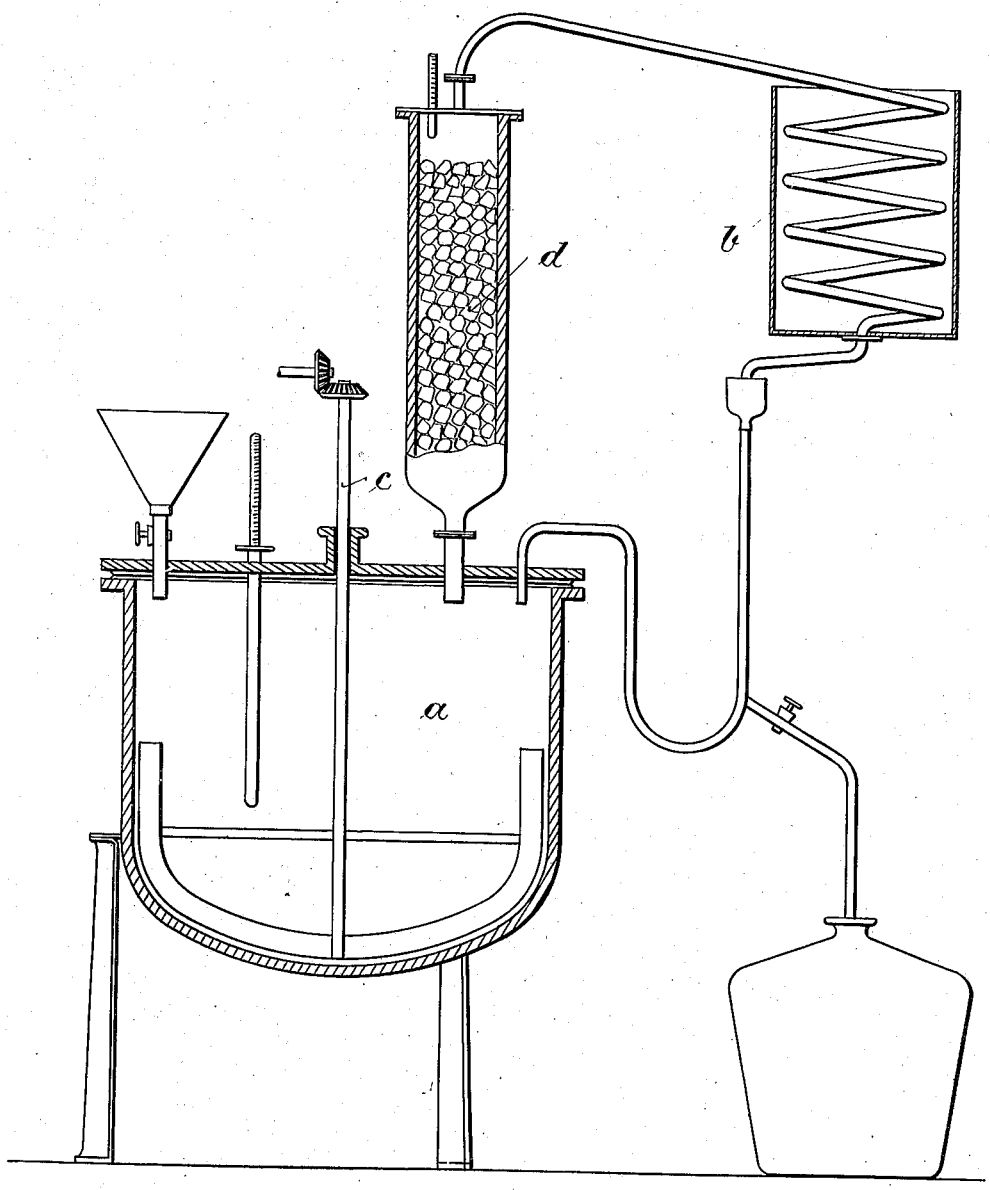

UNITED STATES PATENT OFFICE.

PAUL ASKENASY AND MARTIN MUGDAN, OF NUREMBERG, GERMANY.

PROCESS OF MAKING DICHLORETHYLENE.

No. 924,304.  Specification of Letters Patent.  Patented June 8, 1909.

Application filed October 4, 1907. Serial No. 395,950.

*To all whom it may concern:*

Be it known that we, PAUL ASKENASY, doctor of philosophy, chemist, a subject of the King of Prussia, German Emperor, residing at 54 Gugelstrasse, Nürnberg, Kingdom of Bavaria, German Empire, and MARTIN MUGDAN, doctor of philosophy, chemist, a subject of the King of Prussia, German Emperor, residing at 54 Gugelstrasse, Nürnberg, Kingdom of Bavaria, German Empire, have jointly invented new and useful Improvements in Processes of Manufacturing Dichlorinated Ethylene, of which the following is a specification.

This invention relates to the process of manufacturing dichlorinated ethylene from symmetrical tetrachlorinated ethene by means of metals. One has already proposed to treat halogen derivatives of hydrocarbons for manufacturing unsaturated compounds by means of zinc in presence of alcohol or diluted acids. The use of alcohol is however expensive and requires also a separation of the alcohol from the product of the reaction, which operation causes also losses of the product. The use of diluted acids causes the substitution of halogen by hydrogen and losses of zinc, which is dissolved with development of hydrogen.

We have now found that dichlorinated ethylene may be prepared easily with a nearly quantitative output by treating symmetrical tetrachlorinated ethene with metals insoluble in water, but capable of developing hydrogen with hydrochloric acid, and water, without addition of alcohol or acids. The metals suitable for our process are for instance iron, zinc, aluminium or alloys of the said metals.

In using aluminium or finely divided zinc (for instance zinc dust) the process may be carried by moderately heating the materials whereby a high evolution of heat ensues, so that further external heating is not required. The developed heat is sufficient for evaporating the formed dichlorinated ethylene. In using compact zinc (granulated zinc, zinc scraps) or zinc alloys or iron a heating in a reflex condenser or a heating in the autoclave is required.

The drawing represents a vertical section of one form of an apparatus suitable for carrying out the present process. "A" is a reaction vessel, provided with an agitator "c". "d" is a fractionating tube, which is destined to separate the distilling tetrachlorinated ethene and dichlorinated ethylene from each other. "b" is a reflux cooler. "e" is a cock, which is closed at the beginning of the operation.

Example I: One heats the tetrachlorinated ethene with double its volume of water in the vessel "a" to 60 degrees centigrade in stirring a while by means of the agitator "c". One adds gradually zinc dust. One may also add gradually the tetrachlorinated ethene in an intimately agitated mixture of water and zinc dust. The formed dichlorinated ethylene distils and is condensed in the cooler "b"; it flows back into the reaction vessel. From time to time the cock is opened and the dichlorinated ethylene is led into the bottle. It is freed off from little amounts of vaporized tetrachlorinated ethene by means of the fractionating tube "d". From the formed chlorid of zinc the zinc may be recovered by electrolysis.

Example II: Tetrachlorinated ethene is heated with the equal amount of weight of iron scraps and double the quantity of water during 12 hours during agitation to 120 to 150 degrees centigrade. The formed dichlorinated ethylene will then be distilled away. One may also stop the process after a suitable time, distil the formed dichlorinated ethylene and continue then with the heating.

In both examples the yields of dichlorinated ethylene exceed 90% of the theoretical quantity calculated on tetrachlorinated ethylene.

The reaction may be expressed by the following equation:

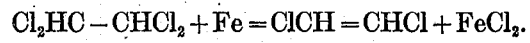

$$Cl_2HC - CHCl_2 + Fe = ClCH = CHCl + FeCl_2.$$

What we claim as our invention, and desire to secure by Letters Patent, is:—

1. The process for manufacturing dichlorinated ethylene which consists in heating symmetrical tetrachlorinated ethene with water and metals which are insoluble in water at ordinary temperature but soluble in hydrochloric acid.

2. The process for manufacturing dichlorinated ethylene which consists in heating symmetrical tetrachlorinated ethene with water and metals which are insoluble in water at ordinary temperature but soluble in hydrochloric acid and distilling off the formed dichlorinated ethylene.

3. The process for manufacturing dichlorinated ethylene which consists in heating symmetrical tetrachlorinated ethene with water and zinc and distilling off the formed dichlorinated ethylene.

PAUL ASKENASY.
MARTIN MUGDAN.

Witnesses:
LUDWIG SCUNINGER,
WILHELM HIRSOHKIND.